United States Patent
Shost et al.

(10) Patent No.: US 10,808,590 B2
(45) Date of Patent: Oct. 20, 2020

(54) SELECTIVE CATALYTIC REDUCTION ADAPTATION FOR ACCURACY AND MINIMIZED TAILPIPE IMPACT

(71) Applicants: Mark A Shost, Northville, MI (US); John D Phillips, Brighton, MI (US); Cornelius Opris, Oxford, MI (US); Arpit Shukla, Royal Oak, MI (US)

(72) Inventors: Mark A Shost, Northville, MI (US); John D Phillips, Brighton, MI (US); Cornelius Opris, Oxford, MI (US); Arpit Shukla, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 146 days.

(21) Appl. No.: 16/026,411

(22) Filed: Jul. 3, 2018

(65) Prior Publication Data
US 2020/0011222 A1  Jan. 9, 2020

(51) Int. Cl.
F01N 3/20 (2006.01)
B01D 53/90 (2006.01)
(Continued)

(52) U.S. Cl.
CPC ............ F01N 3/208 (2013.01); B01D 53/90 (2013.01); B01D 53/9495 (2013.01); F01N 11/00 (2013.01); B01D 2251/2067 (2013.01); B01D 2257/404 (2013.01); F01N 2560/026 (2013.01); F01N 2560/14 (2013.01); F01N 2610/02 (2013.01); F01N 2900/0416 (2013.01);
(Continued)

(58) Field of Classification Search
CPC . B01D 53/9495; F01N 11/00; F01N 2550/02; F01N 2560/021; F01N 2560/026; F01N 2560/12; F01N 2610/02; F01N 2900/1402; F01N 3/2066; F01N 3/208; F01N 9/00; G07C 5/0808; Y02A 50/2325; Y02T 10/24; Y02T 10/47
See application file for complete search history.

(56) References Cited

U.S. PATENT DOCUMENTS 7,736,595 B2  6/2010  Gady et al.
8,429,898 B2  4/2013  Darr et al.
(Continued)

FOREIGN PATENT DOCUMENTS

DE  102016211575 A1  12/2017
DE  102016219555 A1  4/2018
(Continued)

OTHER PUBLICATIONS

International Search Report and Written Opinion dated Sep. 19, 2019 for International Application No. PCT/US2019/040072, International Filing Date Jul. 1, 2019.

*Primary Examiner* — Anthony Ayala Delgado
(74) *Attorney, Agent, or Firm* — Ralph E Smith (57) ABSTRACT

Improved systems and methods for dosing agent injection adaptation for a selective catalytic reduction (SCR) system of an engine of a vehicle involve an adaptation procedure that is generally divided into distinct phases based upon the requirement to obtain an accurate dosing adaptation. The phases themselves provide the specific functions of catalyst ammonia storage depletion, catalyst ammonia storage and NOx conversion stabilization, and adaptation value factor determination and verification.

19 Claims, 2 Drawing Sheets

(51) Int. Cl.
  *B01D 53/94* (2006.01)
  *F01N 11/00* (2006.01)
(52) U.S. Cl.
  CPC .............. *F01N 2900/1402* (2013.01); *F01N 2900/1404* (2013.01); *F01N 2900/1622* (2013.01); *F01N 2900/1818* (2013.01)

(56) References Cited

U.S. PATENT DOCUMENTS

| | | | |
|---|---|---|---|
| 8,869,513 | B2 | 10/2014 | Levijoki et al. |
| 9,133,750 | B2 | 9/2015 | Levijoki et al. |
| 2012/0017567 | A1 | 1/2012 | Geveci et al. |
| 2015/0089466 | A1* | 3/2015 | Rodgers .................. G06F 8/34 717/102 |
| 2017/0241321 | A1* | 8/2017 | Yoo .................... G01M 15/102 |
| 2019/0226382 | A1* | 7/2019 | Moos ................ B01D 53/9431 |

FOREIGN PATENT DOCUMENTS

| | | | |
|---|---|---|---|
| EP | 2333261 | A1 | 6/2011 |
| EP | 2381077 | A1 | 10/2011 |

* cited by examiner

FIG. 1

SELECTIVE CATALYTIC REDUCTION ADAPTATION FOR ACCURACY AND MINIMIZED TAILPIPE IMPACT

FIELD

The present application generally relates to selective catalytic reduction (SCR) systems for vehicle engines and, more particularly, to systems and methods for improved SCR dosing agent injection adaptation for accuracy and minimized tailpipe impact.

BACKGROUND

Selective catalytic reduction (SCR) systems utilize a catalyst (e.g., a zeolite or precious metal) and an injected dosing agent (e.g., ammonia ($NH_3$) based or urea water solutions) to reduce nitrogen oxide (NOx) emissions in exhaust gas produced by an engine. e.g., by converting the NOx components to nitrogen and water. SCR systems are particularly useful for diesel engines, which contain excess oxygen in their exhaust gases, precluding the use of standard three-way catalysts and requiring more complex NOx conversion systems using a Diesel Exhaust Fluid injected into the exhaust system to act as a reductant for NOx conversion. Production build variation and aging effects in operation (e.g., the SCR catalyst and dosing injector ages), which affects NOx conversion performance and potential ammonia slip n tailpipe emissions. One method to minimize these dosing errors and sub-optimal NOx conversion efficiency is to perform a diagnostic adaptation procedure or routine where dosing can be retargeted to achieve the optimal level.

Conventional SCR system adaptation routines in the market today utilize discrete phases to perform the adaptation measurement. However, these phases operate based on calibrated cumulative engine-out NOx emissions and do not adjust the phase duration. This fixed cumulative engine-out NOx phase direction criteria may result in a phase ending earlier than required to achieve the phase goal, resulting in adaptation value in error leading to sub-optimal NOx conversion or potential $NH_3$ slip. Also, these calibrated fixed phase durations may exceed the duration required for goal achievement and these extended phases result in increased emissions from the adaptation routine operation since adaptation typically targets NOx conversion efficiency lower than what will be commanded in operation. Accordingly, while such SCR system adaptations work well for their intended purpose, there remains a need for improvement in the relevant art.

SUMMARY

According to one example aspect of the invention, a selective catalytic reduction (SCR) system for an engine of a vehicle is presented. In one exemplary implementation, the SCR system comprises: an SCR catalyst configured to convert nitrogen oxide (NOx) in an exhaust gas produced by the engine, a dosing system configured to inject an ammonia-based dosing agent into the exhaust gas, NOx sensors arranged upstream and downstream from the SCR catalyst and configured to measure levels of the NOx in the exhaust gas, and a controller configured to monitor the measured NOx levels and to control at least one of the engine and the dosing system to perform an adaptation procedure that eliminates false time-based adaptations, the adaptation procedure comprising: during a first phase, depleting stored ammonia from the SCR catalyst, during a second phase, stabilizing the SCR catalyst with a specific amount of ammonia, during a third phase, determining a dosing accuracy for the SCR catalyst and determining an adaptation factor based on the dosing accuracy, generating first, second, and third flags upon completion of the first, second, and third phases, respectively, and based on the first, second, and third flags and the adaptation factor, controlling the dosing system to mitigate tailpipe NOx emissions.

In some implementations, the dosing system is configured to inject the ammonia-based dosing agent into the exhaust gas according to a NOx conversion efficiency target, and the controller is configured to determine a NOx conversion efficiency of the SCR catalyst based on the measured upstream and downstream NOx levels. In some implementations, the controller is configured to: during the first phase, command a first NOx conversion efficiency target that causes the depletion of the stored ammonia on the SCR catalyst, during the second phase, command a greater second NOx conversion efficiency target that causes the SCR catalyst to stabilize with the specific amount of ammonia, and during the third phase, command a third NOx conversion efficiency target that is different than the second NOx conversion efficiency target and that causes a change in dosing agent injection that enables the dosing accuracy for the SCR catalyst to be determined.

In some implementations, the controller is further configured to: obtain, during production of the vehicle, reference measurements from the upstream and downstream NOx sensors at two or more reference operating conditions that are encounterable during normal vehicle operation, after each particulate filter (PF) regeneration event, obtain comparison measurements from the upstream and downstream NOx sensors when each of the two or more reference operating conditions are first detected, calculate deviations between the comparison measurements and the respective reference measurements, and selectively adjust the adaptation factor based on the calculated deviations. In some implementations, the controller is further configured to utilize the calculated deviations to perform a fractional or proportional change to the adaptation factor by averaging the calculated deviations for two consecutive adaptation procedures.

In some implementations, the controller is further configured to: detect a precondition where deviations between an expected downstream NOx value and the measured downstream NOx value exceeds a difference threshold, in response to detecting the precondition, increase the adaptation factor by a fixed amount for a fixed duration of time to temporarily increase the injection of the ammonia-based dosing agent, during the fixed duration of time, estimate a cumulative tailpipe NOx value and calculate a cumulative measured downstream NOx value, calculate an error by dividing (i) a difference between the estimated cumulative tailpipe NOx value and the determined cumulative measured downstream NOx value and (ii) the estimated cumulative tailpipe NOx value, and generate a fourth flag indicative of the adaptation procedure needing to be performed when the calculated error exceeds an error threshold.

In some implementations, the controller is further configured to verify the adaptation factor by: performing a first, two sample statistical test to determine whether another cycle of the adaptation procedure is required, and when another cycle of the adaptation procedure is not required as determined by the first, two sample statistical test, performing a second, two sample statistical test to determine whether the adaptation factor is accurate. In some implementations, when another cycle of the adaptation procedure is required or the adaptation factor is inaccurate as determined by the first or second statistical tests, respectively, the controller is further configured to perform another cycle of the adaptation procedure.

In some implementations, the controller initiates the second phase upon detection of the first flag, initiates the third phase upon detection of the second flag, and controls the dosing system based on the adaptation factor upon detection of the third flag, wherein the first, second, third phases are distinct periods that do not overlap. In some implementations, the controller is configured to perform the adaptation procedure in response to detection of a precondition where a temperature of the exhaust gas is greater than a threshold where ammonia can be stored thus accomplishing the need for the first phase any associated tailpipe impact of the first phase for the adaptation procedure, and the precondition is (i) a completion of a PF regeneration event where exhaust gas temperature exceeds the threshold or (ii) cruise control of the vehicle being activated such that stable conditions are present and the exhaust gas temperature is greater than a lower threshold and less than an upper threshold.

According to another example aspect of the invention, a method of dosing agent injection adaptation for an SCR catalyst of an SCR system of an engine of a vehicle, the SCR catalyst being configured to convert NOx in an exhaust gas produced by the engine, is presented. In one exemplary implementation, the method comprises: monitoring, by a controller of the vehicle, NOx levels in the exhaust gas using NOx sensors arranged upstream and downstream from the SCR catalyst, and performing, by the controller, an adaptation procedure involving controlling at least one of the engine and a dosing system configured to inject an ammonia-based dosing agent into the exhaust gas based on the monitored NOx levels to eliminate false time-based adaptations, the adaptation procedure comprising: during a first phase, depleting stored ammonia from the SCR catalyst, during a second phase, stabilizing the SCR catalyst with a specific amount of ammonia, during a third phase, determining a dosing accuracy for the SCR catalyst and determining an adaptation factor based on the dosing accuracy, generating first, second, and third flags upon completion of the first, second, and third phases, respectively, and based on the first, second, and third flags and the adaptation factor, controlling the dosing system to mitigate tailpipe NOx emissions.

In some implementations, controlling the dosing system is according to a NOx conversion efficiency target of the SCR catalyst that is determined based on the measured upstream and downstream NOx levels. In some implementations, the adaptation procedure further comprises: during the first phase, commanding a first NOx conversion efficiency target that causes the depletion of the stored ammonia on the SCR catalyst, during the second phase, commanding a greater second NOx conversion efficiency target that causes the SCR catalyst to stabilize with the specific amount of ammonia, and during the third phase, commanding a third NOx conversion efficiency target that is different than the second NOx conversion efficiency target and that causes a change in dosing agent injection that enables the dosing accuracy for the SCR catalyst to be determined.

In some implementations, the method further comprises: obtaining, by the controller and during production of the vehicle, reference measurements from the upstream and downstream NOx sensors at two or more reference operating conditions that are encounterable during normal vehicle operation, after each PF regeneration event, obtaining, by the controller, comparison measurements from the upstream and downstream NOx sensors when each of the two or more reference operating conditions are first detected, calculating, by the controller, deviations between the comparison measurements and the respective reference measurements, and selectively adjusting, by the controller, the adaptation factor based on the calculated deviations. In some implementations, the method further comprises utilizing, by the controller, the calculated deviations to perform a fractional or proportional change to the adaptation factor by averaging the calculated deviations for two consecutive adaptation procedures.

In some implementations, the method further comprises detecting, by the controller, a precondition where deviations between an expected downstream NOx value and the measured downstream NOx value exceeds a difference threshold, in response to detecting the precondition, increasing, by the controller, the adaptation factor by a fixed amount for a fixed duration of time to temporarily increase the injection of the ammonia-based dosing agent, during the fixed duration of time, estimating, by the controller, a cumulative tailpipe NOx value and calculate a cumulative measured downstream NOx value, calculating, by the controller, an error by dividing (i) a difference between the estimated cumulative tailpipe NOx value and the determined cumulative measured downstream NOx value and (ii) the estimated cumulative tailpipe NOx value, and generating, by the controller, a fourth flag indicative of the adaptation procedure needing to be performed when the calculated error exceeds an error threshold.

In some implementations, the adaptation procedure further comprises verifying the adaptation factor by: performing a first, two sample statistical test to determine whether another cycle of the adaptation procedure is required, and when another cycle of the adaptation procedure is not required as determined by the first, two sample statistical test, performing a second, two sample statistical test to determine whether the adaptation factor is accurate. In some implementations, when another cycle of the adaptation procedure is required or the adaptation factor is inaccurate as determined by the first or second statistical tests, respectively, the method further comprises performing, by the controller, another cycle of the adaptation procedure.

In some implementations, the adaptation procedure further comprises initiating the second phase upon detection of the first flag, initiating the third phase upon detection of the second flag, and controlling the dosing system based on the adaptation factor upon detection of the third flag wherein the first, second, third phases are distinct periods that do not overlap. In some implementations, the method further comprises detecting, by the controller as a precondition for performing the adaptation procedure, when a temperature of the exhaust gas is greater than a threshold where ammonia can be stored thus accomplishing the need for the first phase any associated tailpipe impact of the first phase for the adaptation procedure, wherein the precondition is (i) a completion of a PF regeneration event where exhaust gas temperature exceeds the threshold or (ii) cruise control of the vehicle being activated such that stable conditions are present and the exhaust gas temperature is greater than a lower threshold and less than an upper threshold.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, conventional selective catalytic reduction (SCR) system adaptation procedures or routines operate based on a calibrated fixed cumulative engine-out nitrogen oxide (NOx) emissions and do not account for condition variations, potentially resulting in sub-optimal NOx conversion or ammonia ($NH_3$) slip and increased emissions resulting from the adaptation routine operating longer than necessary to perform its goal function. Sub-optimal NOx conversion results in undesirable effects, specifically, under-dosing leads to increased NOx tailpipe emissions, whereas over-dosing leads to $NH_3$ slip. Furthermore, $NH_3$ slip could be read by cross-sensitive NOx sensors as NOx and lead to system adaptation errors where increased dosing would be commanded, thus further increasing the $NH_3$ slip. Accordingly, improved systems and methods for dosing agent injection adaptation for an SCR system of an engine of a vehicle are presented. This adaptation procedure is generally divided into distinct phases based upon the requirement to obtain an accurate dosing adaptation. The phases themselves provide the specific functions of catalyst $NH_3$ storage depletion, catalyst $NH_3$ storage and NOx conversion stabilization, and adaptation value factor determination and verification.

In phase one (depletion), a low NOx conversion efficiency (CE) target is set to deplete the SCR catalyst of stored $NH_3$. Once the target $NH_3$ storage depletion is achieved, phase two (stabilization) begins where a higher NOx CE target is set to stabilize the SCR catalyst with a specific amount of $NH_3$ while also being able to detect over/under loading. Once this target is achieved, a third phase (adaptation) begins where the same or another slightly different NOx CE target is set to determine an adaptation factor that would eliminate NOx conversion error from target. This adaptation factor is then verified either in a latter portion of phase three or a subsequent phase four (verification). This verification includes two steps. First is the detection that the procedure or routine has produced a stable adaptation value, and second is the determination of whether or not the stable adaptation value is different from the prior adaptation value. One method of performing these two steps are to utilize two statistical tests (t-tests) to verify that a stable value has been reached and that it differs from the prior value. Another alternative method of detecting that the routine has produced a stable value is to maintain a circular buffer of values, and finding the difference between the maximum and minimum value in the buffer, and comparing this difference to an appropriately small threshold.

Figure 1:
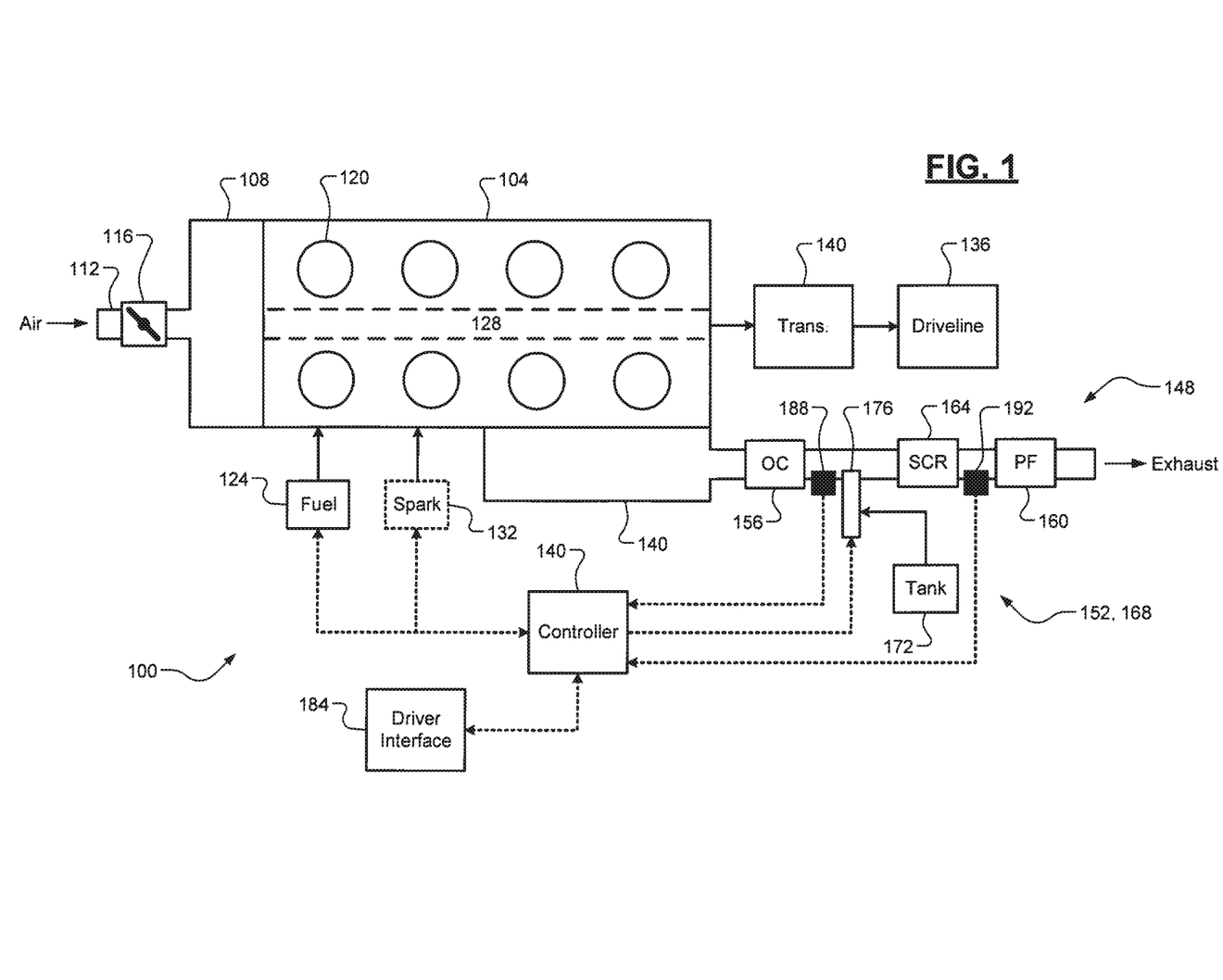
FIG. 1 depicts a diagram of an example vehicle having an engine with a selective catalytic reduction (SCR) system according to the principles of the present disclosure.

Referring now to FIG. 1, a diagram of an example vehicle 100 is illustrated. The vehicle 100 comprises an engine 104 that draws air into an intake manifold 108 through an induction system 112 that is regulated by a throttle valve 116. In one exemplary implementation, the engine 104 is a diesel engine, but it will be appreciated that the engine 104 could be any lean burn engine (e.g., a spark-ignition gasoline engine) that would utilize a lean burn exhaust treatment system. The air in the intake manifold 108 is distributed to a plurality of cylinders 120 and combined with fuel (diesel, gasoline, etc.) from a fuel system 124 to form an air/fuel mixture. While eight cylinders are shown, it will be appreciated that the engine 104 could include any suitable number of cylinders. The fuel system 124 could be configured for port fuel injection (PFI), direct fuel injection (DFI), or in another suitable configuration. The air/fuel mixture is compressed by pistons (not shown) in the cylinders 120 and ignited to drive the pistons and generate drive torque at a crankshaft 128.

The ignition could occur automatically (compression ignition or auto-ignition) or in response to spark from an optional ignition system 132. The drive torque at the crankshaft 128 is transferred to a driveline 136 of the vehicle 100 via a transmission 140 (an automatic transmission, a manual transmission, etc.). Exhaust gas resulting from combustion is expelled from the cylinders 120 into an exhaust manifold 144 that is connected to an exhaust passage 148. The exhaust passage 148 includes a selective catalytic reduction (SCR) system 152 disposed there along. An optional oxidation catalyst (OC) 156 for oxidizing carbon monoxide (CO) and hydrocarbons (HC) to carbon dioxide ($CO_2$) and water ($H_2O$) could be disposed along the exhaust passage 148 at a point upstream from the SCR system 152. An optional particulate filter (PF) 160 could also be disposed along the exhaust passage 148 at a point upstream or downstream from the SCR system 152 for trapping and periodically burning off particulate matter (e.g., ash or soot).

The SCR system 152 comprises an SCR catalyst 164 and a dosing system 168 configured to inject a dosing or reducing agent (e.g., an ammonia-based dosing agent, such as urea water solution) into the exhaust passage 148 upstream from the SCR catalyst 156. Non-limiting examples of the material forming the SCR catalyst 156 include a zeolite and a precious metal). The dosing system 168 further comprises a dosing agent tank 172 and a dosing agent injector 176, but it will be appreciated that the dosing system 160 could include other components that are not illustrated (a heater, a pump, flow sensors, etc.). The injection of the dosing agent into the exhaust passage 148 causes the SCR catalyst 164 to store the reducing agent on its surface, which causes a chemical reaction with the NOx in the exhaust gas to convert the NOx to nitrogen ($N_2$) and water ($H_2O$). As discussed above, the conversion efficiency of the SCR catalyst 164 varies, such as due to production or manufacturing tolerances and due to aging over time. Thus, adaptation of the dosing agent injection is necessary to achieve optimal NOx conversion efficiency.

A controller 180 (e.g., an engine control unit, or ECU) controls operation of the vehicle 100, including the engine 104 and the SCR system 152. The controller 180, for example, receives input from a driver of the vehicle 100 via a driver interface 184 (e.g., an accelerator pedal). Another example of the driver interface 184 could include a cruise control activation switch, which the driver could utilize to enable cruise control for the vehicle 100. Based on a torque request determined from the driver input, the controller 180 controls air/fuel (and, if applicable, spark) such that the engine 104 generates a desired drive torque. The controller 180 also controls operation of the SCR system 152, such as controlling the dosing agent injector 176 to inject a desired amount of dosing agent. This could be based, for example, on a NOx conversion efficiency ratio based on measurements from NOx sensors 188, 192 disposed along the exhaust passage 148 at points upstream and downstream from the SCR catalyst 164. It will be appreciated that the upstream NOx sensor 188 could be arranged upstream or downstream from the dosing agent injector 176. The specific dosing agent injection adaptation and verification method of the present disclosure will now be described in greater detail below.

Figure 2:
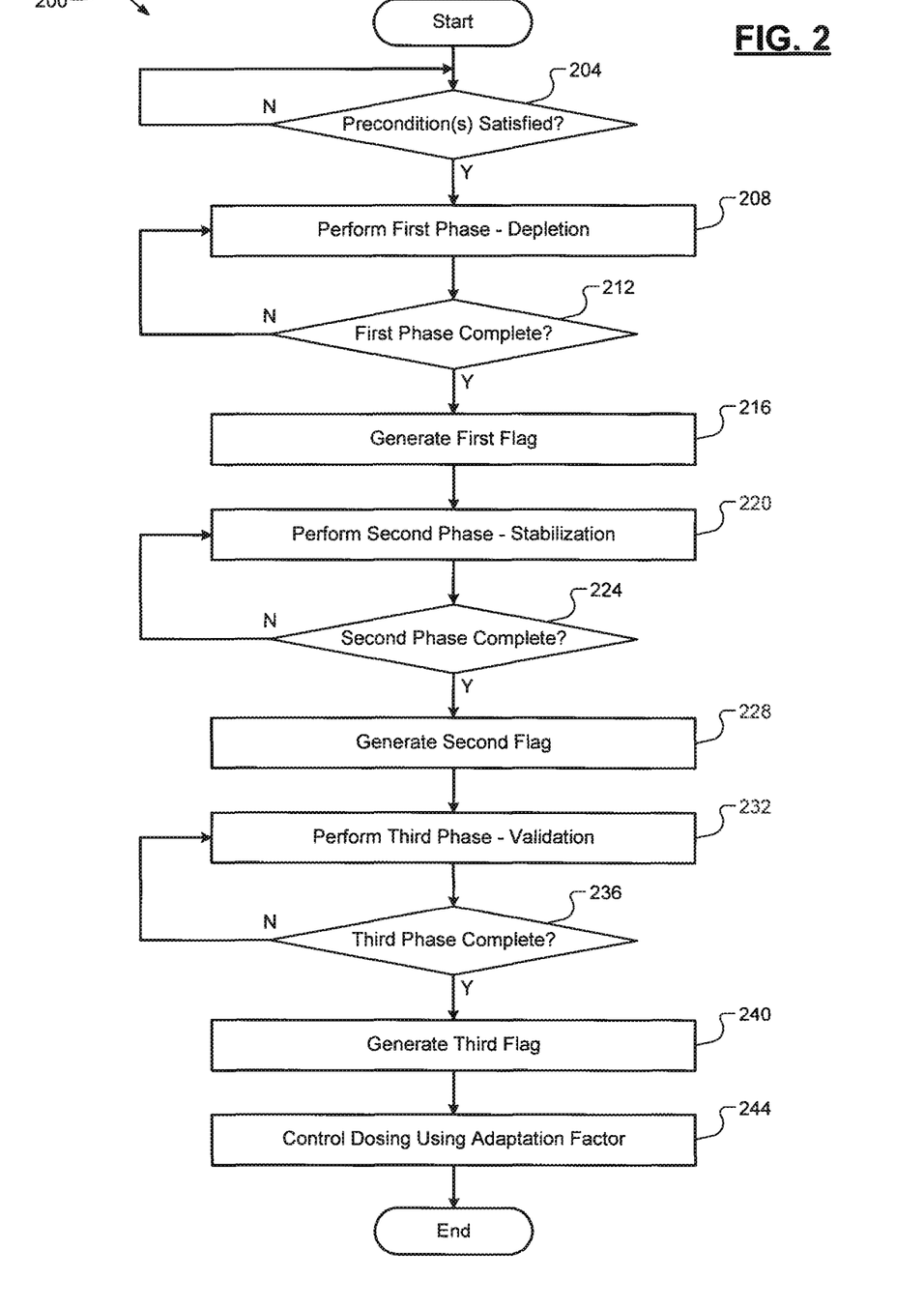
FIG. 2 depicts a flow diagram of an example method of dosing agent injection adaptation for an SCR system according to the principles of the present disclosure.

Referring now to FIG. 2, a flow diagram of an example method 200 of dosing agent injection adaptation for the SCR system 152 is illustrated. At optional 204, the controller 180 detects one or more preconditions for performing a dosing agent injection adaptation procedure. For example, one precondition could be an operational state of the engine where exhaust gas temperature is greater than a specific threshold (e.g., 600-700 degrees Celsius). Such a high exhaust gas temperature could be beneficial to depleting the ammonia load on the SCR catalyst 164. In one exemplary implementation, the one or more preconditions include a regeneration event of the particulate filter 160 having recently completed, which involves increasing the exhaust gas temperature to high levels to burn off the stored particulate matter. In some exemplary implementations, the one or more preconditions include cruise control of the vehicle 100 being activated (i.e., pedal-off), which provides for steady-state or stable conditions that could improve the speed and/or accuracy of the adaptation procedure. When the one or more optional preconditions are satisfied, the method 200 proceeds to 208. Otherwise, the method 200 ends or returns to 204.

Another example precondition could be performed by comparing reference and comparison measurements from the upstream and downstream NOx sensors 188 and 192 at the same operating conditions in a series of sub-steps of 204 (e.g., 204a, 204b, etc.). This is because NOx sensors typically have a variability of up to +1-10% of absolute or up to +1-10 parts per million (ppm) below a certain value (e.g., 100 ppm). This error is typically unknown at the time of installation, and thus the controller 180 is completely unaware of this error. This error can also be caused by the relative drift of NOx sensors over time. The error affects the readings of both the upstream and downstream NOx sensors 188 and 192. Inaccuracy of the upstream NOx sensor 188 impacts the dosing amount, whereas inaccuracy of the downstream NOx sensor 192 may have an impact on the adaptation procedure results.

These reference measurements could be obtained by the controller 180, for example, during vehicle production (e.g., at the factory during a hot test) at two or more different reference operating conditions. The controller 180 permanently stores these values in memory (e.g., non-volatile memory, or NVM). These reference operating conditions could be selected, for example, such that there is a high likelihood that they will occur during normal vehicle operation (e.g., highway or normal street driving at relatively stable conditions). These reference operating conditions could be calibratable and associated with thresholds for duration and detection. After each regeneration event of the PF 160, the controller 180 obtains comparison measurements from the upstream and downstream NOx sensors 188, 192 when each of the two or more reference operating conditions are first detected.

The controller 180 then calculates deviations between the comparison measurements and either (i) the original respective reference measurements or (ii) previously stored respective measurements, and the controller then selectively adjusts the adaptation factor based on the calculated deviations. In one exemplary implementation, the controller 180 is configured to utilize the calculated deviations to perform a fractional or proportional change to the adaptation factor by averaging the calculated deviations for two consecutive adaptation procedures. The fractional change, for example, could be a calibratable value that is added to or subtracted from the adaptation factor, and the fractional change could be related to or based on engine and/or NOx sensor parameters. The proportional change, for example, could be a calibratable multiplier that is applied to the adaptation factor. It will also be appreciated that this adaptation factor adjustment routine could be performed in addition to (e.g., as a precondition) or in place of the adaptation procedure described below (steps 208-240).

Yet another example precondition could be based on deviations between estimated and measured downstream NOx values in a series of sub-steps of 204 (e.g., 204a, 204b, etc.). The purpose of this precondition is to avoid adaptations that could lead to an unchanged adaptation factor, thereby further minimizing tailpipe NOx emissions over the life of the vehicle 100. The controller 180 first calculates a deviation between an estimated downstream NOx value and the actual or measured downstream NOx value from downstream NOx sensor 192. When the difference exceeds a difference threshold, the controller 180 increases the adaptation factor by a fixed amount for a fixed duration of time to temporarily increase the injection of the ammonia-based dosing agent. During this fixed duration of time, the controller 180 estimates a cumulative tailpipe NOx value and calculates a cumulative measured downstream NOx value (e.g., based on measurements from downstream NOx sensor 192). The controller 180 then calculates an error by dividing (i) a difference between the estimated cumulative tailpipe NOx value (X) and the determined cumulative measured downstream NOx value (Y) and (ii) the estimated cumulative tailpipe NOx value (Y). In mathematical form, the error (in %) equals $(X-Y)/Y$. Lastly, the controller 180 generates a flag (e.g., a fourth flag different from the first/second/third flags described below) or another suitable signal indicative of the adaptation procedure needing to be performed when the calculated error exceeds an error threshold (e.g., +/−0.02%).

At 208, the controller 180 performs a first phase of the adaptation procedure. The first phase generally involves depleting the ammonia load on the SCR catalyst 164 to a specific level. In one exemplary implementation, the ammonia load depletion is performed by the controller 180 setting a first target NOx conversion efficiency (CE) threshold that is relatively low. This could optionally involve closed-loop control using the threshold such that dosing could be increased to maintain the threshold but not allowing the ammonia load to go above the threshold. For example only, the ammonia load target could be depleted to approximately a 75% load. Conventional techniques typically deplete the ammonia load to ~5%, which takes much more time. In one exemplary implementation, the controller 180 adjusts operation of the engine 104 to increase the exhaust gas temperature for ammonia load depletion, such as by running the engine 104 with a rich fuel/air ratio. At 212, the controller 180 determines whether the first phase has completed (e.g., whether the load threshold has been achieved). When true, the controller 180 generates a first flag at 216 indicating that the first phase has completed. Otherwise, the method 200 ends or returns to 208. It should also be noted that in some embodiments this first phase of the adaptation procedure (steps 208-212) could be skipped when the precondition(s) indicate high exhaust temperatures where it could be assumed that the ammonia load has depleted.

At 220, the controller 180 performs a second phase of the adaptation procedure. In one exemplary implementation, the controller 180 begins the second phase immediately upon detection of the first flag, thereby reducing the overall time of the adaptation procedure. The second phase generally involves stabilizing the SCR catalyst 164 with a specific amount of ammonia. In one exemplary implementation, the ammonia load stabilization is performed by the controller 180 by setting a second target NOx CE threshold that is higher than the first NOx CE threshold and is selected such that over/under dosing is able to be detected. Similar to the first phase, this could involve closed-loop control based on the target threshold. The duration of the second phase can be relatively short compared to conventional techniques, which are typically time-based. At 224, the controller 180 determines whether the second phase has completed. When true, the controller 180 generates a second flag at 228 indicating that the second phase has completed. Otherwise, the method 200 ends or returns to 220.

At 232, the controller 180 performs the third phase of the adaptation procedure. In one exemplary implementation, the controller 180 begins the third phase immediately upon detection of the third flag, thereby reducing the overall time of the adaptation procedure. The third phase generally involves adjusting dosing such that dosing accuracy is able to be determined and determining an adaptation factor for dosing agent injection. In one exemplary implementation, the accuracy determination and adaptation factor determination is performed by the controller 180 by setting a third NOx CE threshold that is similar to but different than the second NOx CE threshold. This allows for minimization or elimination of any error in transitioning from the second NOx CE threshold. At 236, the controller 180 determines whether the third phase has completed. This optionally involves verification of the adaptation factor, which could be a latter portion of the third phase or a separate fourth phase thereafter. When true, the controller 180 generates a third flag at 240 indicating that the third phase has completed and the controller 180 utilizes the adaptation factor to adjust dosing agent injection at 244. Otherwise, the method 200 ends or returns to 232.

The optional verification procedure involves determining whether the determined adaptation factor is accurate and should be kept (i.e., replace a previous adaptation factor). This previous adaptation factor could be stored, for example, in a memory of the controller 180. In one exemplary implementation, this verification procedure involves two sequential statistical tests (t-tests). The first t-test is arranged as a two-sample t-test comparing the previous adaptation factor and the previous variance with the recently determined adaptation factor and the recently determined variance. The variation of the present adaptation factor and the previous adaptation factor are combined to represent the variance of the difference between the previous and recent factors. For example, the following equation could be utilized:

$$\frac{|\bar{x}_1 - \bar{x}_2|}{\sqrt{\sigma_1^2/n_1 + \sigma_2^2/n_2}} > t_{crit}$$

Where $\bar{x}_1$ represents the previous adaptation factor, $\bar{x}_2$ represents the present adaptation factor, $\sigma_1^2$ represents the variation of the previous adaptation factor, $\sigma_2^2$ represents the variation of the present adaptation factor, and $n_1$ and $n_2$ represent the sample sizes utilized to calculate the averages and variances. Alternatively, the equation given above could be squared without loss of generality, and this squared equation value would avoid the absolute value calculation and the square root calculation shown above.

For example only, $n_1$ and $n_2$ could both equal 50. If the above inequality is satisfied, the null hypothesis, which is the two values are statistically the same, is rejected, and the alternative hypothesis, which is the two values are statistically different, is accepted. The critical value of t ($t_{crit}$) is chosen to yield a first degree of confidence (e.g., 95%) when the present and previous adaptation factors are very similar and higher second degree of confidence (e.g., 99%) when the present and previous adaptation factors are more different. The second t-test is also arranged as similar two-sample t-test, but it compares the present adaptation factor with a copy of itself from a specific number of samples ago (e.g., 50 samples ago). If the inequality is satisfied, the two values are statistically different, and therefore judged to not yet be stable. If the inequality is not satisfied, the two values are statistically the same and judged to be stable. Alternatively, the stability can be detected by comparing the range (the highest value minus the lower value) encountered during the collection of the sample to an appropriately small threshold. Note that for the first t-test, we are waiting for the null hypothesis to be rejected, whereas in the second t-test we are waiting for the null hypothesis to be accepted. Both have to be true before the present adaptation factor is adopted and utilized.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It will also be appreciated that the controller could include non-volatile memory (NVM) for long-term storage of values, such as adaptation factors and their variances as described above.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A selective catalytic reduction (SCR) system for an engine of a vehicle, the SCR system comprising:
   an SCR catalyst configured to convert nitrogen oxide (NOx) in an exhaust gas produced by the engine;
   a dosing system configured to inject an ammonia-based dosing agent into the exhaust gas;
   NOx sensors arranged upstream and downstream from the SCR catalyst and configured to measure levels of the NOx in the exhaust gas; and
   a controller configured to monitor the measured NOx levels and to control at least one of the engine and the dosing system to perform an adaptation procedure that eliminates false time-based adaptations, the adaptation procedure comprising during a first phase, depleting stored ammonia from the SCR catalyst;

during a second phase, providing the SCR catalyst with a stable amount of ammonia;

during a third phase, determining a dosing accuracy for the SCR catalyst and determining an adaptation factor based on the dosing accuracy;

generating first, second, and third flags upon completion of the first, second, and third phases, respectively; and based on the first, second, and third flags and the adaptation factor, controlling the dosing system to mitigate tailpipe NOx emissions, wherein the controller is configured to perform the adaptation procedure in response to detection of a precondition where a temperature of the exhaust gas is greater than a threshold where ammonia can be stored thus accomplishing the need for the first phase any associated tailpipe impact of the first phase for the adaptation procedure, and wherein the precondition is (i) a completion of a regeneration event of a particulate filter (PF) of the engine where exhaust gas temperature exceeds the threshold or (ii) cruise control of the vehicle being activated such that stable conditions are present and the exhaust gas temperature is greater than a lower threshold and less than an upper threshold.

2. The SCR system of claim 1, wherein the controller initiates the second phase upon detection of the first flag, initiates the third phase upon detection of the second flag, and controls the dosing system based on the adaptation factor upon detection of the third flag, wherein the first, second, third phases are distinct periods that do not overlap.

3. The SCR system of claim 1, wherein:

the dosing system is configured to inject the ammonia-based dosing agent into the exhaust gas according to a NOx conversion efficiency target; and the controller is configured to determine a NOx conversion efficiency of the SCR catalyst based on the measured upstream and downstream NOx levels.

4. The SCR system of claim 3, wherein the controller is configured to:

during the first phase, command a first NOx conversion efficiency target that causes the depletion of the stored ammonia on the SCR catalyst;

during the second phase, command a greater second NOx conversion efficiency target that causes the SCR catalyst to stabilize with the stable amount of ammonia; and during the third phase, command a third NOx conversion efficiency target that is different than the second NOx conversion efficiency target and that causes a change in dosing agent injection that enables the dosing accuracy for the SCR catalyst to be determined.

5. The SCR system of claim 1, wherein the controller is further configured to:

obtain, during production of the vehicle, reference measurements from the upstream and downstream NOx sensors at two or more reference operating conditions that are encounterable during normal vehicle operation;

after each PF regeneration event, obtain comparison measurements from the upstream and downstream NOx sensors when each of the two or more reference operating conditions are first detected;

calculate deviations between the comparison measurements and the respective reference measurements; and selectively adjust the adaptation factor based on the calculated deviations.

6. The SCR system of claim 5, wherein the controller is further configured to utilize the calculated deviations to perform a fractional or proportional change to the adaptation factor by averaging the calculated deviations for two consecutive adaptation procedures.

7. The SCR system of claim 1, wherein the controller is further configured to:

detect a precondition where deviations between an expected downstream NOx value and the measured downstream NOx value exceeds a difference threshold;

in response to detecting the precondition, increase the adaptation factor by a fixed amount for a fixed duration of time to temporarily increase the injection of the ammonia-based dosing agent;

during the fixed duration of time, estimate a cumulative tailpipe NOx value and calculate a cumulative measured downstream NOx value;

calculate an error by dividing (i) a difference between the estimated cumulative tailpipe NOx value and the determined cumulative measured downstream NOx value and (ii) the estimated cumulative tailpipe NOx value; and generate a fourth flag indicative of the adaptation procedure needing to be performed when the calculated error exceeds an error threshold.

8. The SCR system of claim 1, wherein the controller is further configured to verify the adaptation factor by:

performing a first, two sample statistical test to determine whether another cycle of the adaptation procedure is required; and when another cycle of the adaptation procedure is not required as determined by the first, two sample statistical test, performing a second, two sample statistical test to determine whether the adaptation factor is accurate.

9. The SCR system of claim 8, wherein when another cycle of the adaptation procedure is required or the adaptation factor is inaccurate as determined by the first or second statistical tests, respectively, the controller is further configured to perform another cycle of the adaptation procedure.

10. A method of dosing agent injection adaptation for a selective catalytic reduction (SCR) catalyst of an SCR system of an engine of a vehicle, the SCR catalyst being configured to convert nitrogen oxide (NOx) in an exhaust gas produced by the engine, the method comprising:

monitoring, by a controller of the vehicle, NOx levels in the exhaust gas using NOx sensors arranged upstream and downstream from the SCR catalyst; and performing, by the controller, an adaptation procedure involving controlling at least one of the engine and a dosing system configured to inject an ammonia-based dosing agent into the exhaust gas based on the monitored NOx levels to eliminate false time-based adaptations, the adaptation procedure comprising:

during a first phase, depleting stored ammonia from the SCR catalyst;

during a second phase, providing the SCR catalyst with a stable amount of ammonia;

during a third phase, determining a dosing accuracy for the SCR catalyst and determining an adaptation factor based on the dosing accuracy;

generating first, second, and third flags upon completion of the first, second, and third phases, respectively; and based on the first, second, and third flags and the adaptation factor, controlling the dosing system to mitigate tailpipe NOx emissions, wherein controlling the dosing system is according to a NOx conversion efficiency target of the SCR catalyst that is determined based on the measured upstream and downstream NOx levels, and wherein the adaptation procedure further comprises:
during the first phase, commanding a first NOx conversion efficiency target that causes the depletion of the stored ammonia on the SCR catalyst;
during the second phase, commanding a greater second NOx conversion efficiency target that causes the SCR catalyst to stabilize with the stable amount of ammonia; and
during the third phase, commanding a third NOx conversion efficiency target that is different than the second NOx conversion efficiency target and that causes a change in dosing agent injection that enables the dosing accuracy for the SCR catalyst to be determined.

11. The method claim 10, wherein the adaptation procedure further comprises initiating the second phase upon detection of the first flag, initiating the third phase upon detection of the second flag, and controlling the dosing system based on the adaptation factor upon detection of the third flag wherein the first, second, third phases are distinct periods that do not overlap.

12. The method of claim 10, wherein the engine comprises a particular filter (PF), and further comprising:
obtaining, by the controller and during production of the vehicle, reference measurements from the upstream and downstream NOx sensors at two or more reference operating conditions that are encounterable during normal vehicle operation;
after each regeneration event of the PF, obtaining, by the controller, comparison measurements from the upstream and downstream NOx sensors when each of the two or more reference operating conditions are first detected;
calculating, by the controller, deviations between the comparison measurements and the respective reference measurements; and
selectively adjusting, by the controller, the adaptation factor based on the calculated deviations.

13. The method of claim 12, further comprising utilizing, by the controller, the calculated deviations to perform a fractional or proportional change to the adaptation factor by averaging the calculated deviations for two consecutive adaptation procedures.

14. The method of claim 10, further comprising:
detecting, by the controller, a precondition where deviations between an expected downstream NOx value and the measured downstream NOx value exceeds a difference threshold;
in response to detecting the precondition, increasing, by the controller, the adaptation factor by a fixed amount for a fixed duration of time to temporarily increase the injection of the ammonia-based dosing agent;
during the fixed duration of time, estimating, by the controller, a cumulative tailpipe NOx value and calculate a cumulative measured downstream NOx value;
calculating, by the controller, an error by dividing (i) a difference between the estimated cumulative tailpipe NOx value and the determined cumulative measured downstream NOx value and (ii) the estimated cumulative tailpipe NOx value; and
generating, by the controller, a fourth flag indicative of the adaptation procedure needing to be performed when the calculated error exceeds an error threshold.

15. The method of claim 10, wherein the adaptation procedure further comprises verifying the adaptation factor by:
performing a first, two sample statistical test to determine whether another cycle of the adaptation procedure is required; and
when another cycle of the adaptation procedure is not required as determined by the first, two sample statistical test, performing a second, two sample statistical test to determine whether the adaptation factor is accurate.

16. The method of claim 15, wherein when another cycle of the adaptation procedure is required or the adaptation factor is inaccurate as determined by the first or second statistical tests, respectively, the method further comprises performing, by the controller, another cycle of the adaptation procedure.

17. The method of claim 10, wherein the engine comprises a particular filter (PF), and further comprising:
detecting, by the controller as a precondition for performing the adaptation procedure, when a temperature of the exhaust gas is greater than a threshold where ammonia can be stored thus accomplishing the need for the first phase any associated tailpipe impact of the first phase for the adaptation procedure,
wherein the precondition is (i) a completion of a regeneration event of the PF where exhaust gas temperature exceeds the threshold or (ii) cruise control of the vehicle being activated such that stable conditions are present and the exhaust gas temperature is greater than a lower threshold and less than an upper threshold.

18. A method of dosing agent injection adaptation for a selective catalytic reduction (SCR) catalyst of an SCR system of an engine of a vehicle, the SCR catalyst being configured to convert nitrogen oxide (NOx) in an exhaust gas produced by the engine, the method comprising:
monitoring, by a controller of the vehicle, NOx levels in the exhaust gas using NOx sensors arranged upstream and downstream from the SCR catalyst; and
performing, by the controller, an adaptation procedure involving controlling at least one of the engine and a dosing system configured to inject an ammonia-based dosing agent into the exhaust gas based on the monitored NOx levels to eliminate false time-based adaptations, the adaptation procedure comprising:
during a first phase, depleting stored ammonia from the SCR catalyst;
during a second phase, stabilizing the SCR catalyst with a stable amount of ammonia;
during a third phase, determining a dosing accuracy for the SCR catalyst and determining an adaptation factor based on the dosing accuracy;
generating first, second, and third flags upon completion of the first, second, and third phases, respectively; and
based on the first, second, and third flags and the adaptation factor, controlling the dosing system to mitigate tailpipe NOx emissions,
wherein the adaptation procedure further comprises verifying the adaptation factor by:

performing a first, two sample statistical test to determine whether another cycle of the adaptation procedure is required; and when another cycle of the adaptation procedure is not required as determined by the first, two sample statistical test, performing a second, two sample statistical test to determine whether the adaptation factor is accurate.

19. The method of claim 18, wherein when another cycle of the adaptation procedure is required or the adaptation factor is inaccurate as determined by the first or second statistical tests, respectively, the method further comprises performing, by the controller, another cycle of the adaptation procedure.

* * * * *